(12) United States Patent
Higuchi et al.

(10) Patent No.: US 7,851,573 B2
(45) Date of Patent: Dec. 14, 2010

(54) AQUEOUS POLYTETRAFLUOROETHYLENE EMULSION, POLYTETRAFLUOROETHYLENE FINE POWDER AND POROUS MATERIAL OBTAINED THEREFROM

(75) Inventors: Shinya Higuchi, Tokyo (JP); Hiroki Kamiya, Tokyo (JP); Jun Hoshikawa, Tokyo (JP); Yasuhiko Matsuoka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/104,680

(22) Filed: Apr. 17, 2008

(65) Prior Publication Data

US 2008/0200571 A1 Aug. 21, 2008

Related U.S. Application Data

(63) Continuation of application No. PCT/JP2006/320601, filed on Oct. 16, 2006.

(30) Foreign Application Priority Data

Oct. 17, 2005 (JP) .............................. 2005-302340

(51) Int. Cl.
*C08F 14/18* (2006.01)
(52) U.S. Cl. .................. 526/255; 524/300; 524/301; 524/320; 524/544; 524/546; 524/805; 428/36.5; 428/311.11
(58) Field of Classification Search .................. 524/544; 526/255
See application file for complete search history.

(56) References Cited

U.S. PATENT DOCUMENTS

| | | | | |
|---|---|---|---|---|
| 3,953,566 | A * | 4/1976 | Gore ........................... | 264/505 |
| 4,380,618 | A | 4/1983 | Khan et al. | |
| 4,384,092 | A * | 5/1983 | Blaise et al. ................. | 526/225 |
| 6,521,730 | B1 * | 2/2003 | Pabon et al. ................. | 526/245 |
| 2003/0181572 | A1 * | 9/2003 | Tan et al. ..................... | 524/502 |
| 2004/0186219 | A1 | 9/2004 | Dadalas et al. | |
| 2005/0137371 | A1 * | 6/2005 | Smith et al. .................. | 526/247 |
| 2006/0199898 | A1 * | 9/2006 | Funaki et al. ................ | 524/544 |
| 2006/0276574 | A1 | 12/2006 | Hoshikawa et al. | |
| 2007/0015864 | A1 | 1/2007 | Hintzer et al. | |
| 2007/0025902 | A1 | 2/2007 | Hintzer et al. | |
| 2007/0027251 | A1 | 2/2007 | Hintzer et al. | |
| 2008/0015304 | A1 | 1/2008 | Hintzer et al. | |
| 2008/0033063 | A1 | 2/2008 | Hoshikawa et al. | |
| 2008/0114122 | A1 | 5/2008 | Brothers et al. | |

FOREIGN PATENT DOCUMENTS

| | | |
|---|---|---|
| EP | 0219065 B1 * | 4/1987 |
| EP | 0 633 053 A1 | 1/1995 |
| EP | 1 172 382 A2 | 1/2002 |
| EP | 1 698 662 A1 | 9/2006 |
| JP | 39-24263 | 10/1964 |
| JP | 2002-308914 | 10/2002 |
| JP | 2002-317003 | 10/2002 |
| JP | 2003-119204 | 4/2003 |
| RU | 94042904 | 7/1996 |
| WO | WO 97/08214 | 3/1997 |
| WO | WO 00/71590 A1 | 11/2000 |
| WO | WO 2005/042593 A1 | 5/2005 |

* cited by examiner

*Primary Examiner*—Mark Eashoo
*Assistant Examiner*—Nicole M Buie-Hatcher
(74) *Attorney, Agent, or Firm*—Oblon, Spivak, McClelland, Maier & Neustadt, L.L.P.

(57) ABSTRACT

To provide an aqueous polytetrafluoroethylene (PTFE) emulsion which does not substantially contain ammonium perfluorooctanoate, and which is obtained by emulsion polymerization. Further, to provide a PTFE fine powder which is obtained from the aqueous PTFE emulsion and is excellent in a paste extrusion processability, and a porous material. An aqueous polytetrafluoroethylene emulsion obtained by carrying out emulsion polymerization of tetrafluoroethylene alone or together with another copolymerizable monomer in an aqueous medium, wherein a fluorinated emulsifier of the formula (1): $CF_2CF_2(O)mCF_2CF_2OCF_2COOA$ wherein X is a hydrogen atom or a fluorine atom, A is a hydrogen atom, an alkali metal or $NH_4$, and m is an integer of 0 or i, is used in an amount of from 1,500 to 20,000 ppm, based on the final yield of polytetrafluoroethylene.

3 Claims, No Drawings

AQUEOUS POLYTETRAFLUOROETHYLENE EMULSION, POLYTETRAFLUOROETHYLENE FINE POWDER AND POROUS MATERIAL OBTAINED THEREFROM

TECHNICAL FIELD

The present invention relates to a new aqueous polytetrafluoroethylene emulsion made by using a specific fluorinated emulsifier, and a polytetrafluoroethylene fine powder and a porous material obtained therefrom.

BACKGROUND ART

When a fluorinated polymer such as polytetrafluoroethylene (hereinafter referred to as PTFE) is formed by using an emulsion polymerization method, a fluorinated emulsifier is usually used, since it does not hinder the polymerization reaction of a fluorinated monomer by chain transfer, in an aqueous medium.

An aqueous PTFE emulsion is obtained by emulsion polymerization of tetrafluoroethylene (hereinafter referred to as TFE). By coagulating the aqueous emulsion, followed by drying, a PTFE fine powder is obtained. The fine powder is shaped by paste extrusion, and then, is used for various purposes. On the other hand, an aqueous PTFE dispersion obtained by having the aqueous emulsion itself concentrated or treated for stability, as the case requires, is used for various applications such as an application for coating, or an application for impregnation by adding various additives.

For emulsion polymerization of a fluorinated monomer, ammonium perfluorooctanoate (structural formula: $CF_3(CF_2)_6COONH_4$, hereinafter referred to as APFO) is usually used, as a fluorinated emulsifier. In recent years, from an environmental viewpoint, it has been proposed to control disposal of APFO, since APFO is not present in nature and is hardly decomposed. Further, it has been pointed out that APFO has a high bioaccumulation potential.

However, in emulsion polymerization of TFE, it is difficult to decrease the amount of the fluorinated emulsifier to be used. Further, in order to recover the fluorinated emulsifier from the aqueous PTFE emulsion, the aqueous PTFE dispersion or the wastewater from coagulation after emulsion polymerization, a new additional facility will be necessary, and the cost of making PTFE will be increased.

Heretofore, a fluorinated emulsifier other than APFO, has been proposed which is used for copolymerization of a fluorinated monomer alone or a fluorinated monomer and another monomer (Patent Documents 1, 2, 3 and 4).

Patent Document 1 discloses Examples wherein a fluorinated emulsifier of the formula $F—(CF_2)_p—O—(CF(Y)—CF_2—O—)_q—CF(Y)COOB$ wherein Y is a fluorine atom or a perfluoromethyl group, p is from 1 to 5, q is from 0 to 10, and B is a hydrogen atom or a monovalent salt, is used. Among the Examples, there is a case wherein a fluorinated emulsifier of the structural formula $CF_3CF_2OCF_2CF_2OCF_2COONH_4$ is used to copolymerize TFE and hexafluoropropylene (hereinafter referred to as HFP). In this case, the amount of the fluorinated emulsifier used is calculated to be about 1,040 ppm, based on the amount of finally formed copolymer.

However, Patent Document 1 discloses no case of polymerization of TFE alone by using the fluorinated emulsifier. Further, when TFE was polymerized alone by using the fluorinated emulsifier in an amount of 1,040 ppm, based on the amount of finally formed PTFE (hereinafter referred to also as the final yield of PTFE), the polymerization speed showed an abnormal rate, and a large amount of a solidified product was formed, whereby it has been found difficult to carry out the emulsion polymerization stably.

Further, the standard specific gravity of a copolymer of TFE and HFP, which was obtained by the Example of Patent Document 1, is 2.220. This value of the standard specific gravity indicates that the molecular weight of the copolymer is low. Namely, it is indicated that there is a problem such that even if TFE and HFP are copolymerized by using the fluorinated emulsifier, it is possible only to obtain a TFE/HFP copolymer having a low molecular weight.

Further, the copolymer of TFE and HFP in an aqueous emulsion, which is obtained by the Example in Patent Document 1, has an average primary particle size of 0.176 µm, i.e. the particle size is small. In general, in a case where paste extrusion is carried out by using a fine powder obtained from particles having a small average primary particle size, there is a problem of insufficiency of extrusion processability such that the pressure of paste extrusion increases, and the appearance of the shaped product is impaired. Further, in a case where an aqueous PTFE dispersion obtained by adding various additives to an aqueous PTFE emulsion, is used in an application for coating, there will be a problem such that if the average primary particle size is small, cracks are likely to form on the coated film.

Further, in emulsion polymerization of TFE, it is generally known that if the amount of the fluorinated emulsion used is increased, the average primary particle size of PTFE to be obtained becomes small. In the case of the Example in Patent Document 1, it is anticipated that if the amount of the fluorinated emulsifier used is increased, the average primary particle size would be smaller.

In an Example in Patent Document 2, $CF_3CF_2CF_2C(CF_3)CF_2OCF(CF_3)COONH_4$ is disclosed, as an emulsifier for polymerization, and it is found that the emulsifier has a higher bioaccumulation potential than APFO.

In Examples in Patent Document 3, $CF_3CF_2CF_2C(CF_3)_2(CH_2)_2COONH_4$, etc. are disclosed, as emulsifiers for polymerization. In general, in a fluorinated emulsifier, if hydrogen atoms are introduced into the molecule of the fluorinated emulsifier, chain transfer is likely to take place during the polymerization of a fluorinated monomer, whereby there will be a problem such that the molecular weight of a fluorinated polymer to be obtained will not be sufficiently high.

In Examples in Patent Document 4, $F(CF_2)_5OCF(CF_3)COONH_4$, etc. are disclosed, as emulsifiers for polymerization.

Patent Document 1: JP-B-39-24263
Patent Document 2: JP-A-2003-119204
Patent Document 3: JP-A-2002-308914
Patent Document 4: JP-A-2002-317003

DISCLOSURE OF THE INVENTION

Objects to be Accomplished by the Invention

An object of the present invention is to provide an aqueous PTFE emulsion which does not substantially contain APFO, which is able to provide PTFE having a high molecular weight, which is able to increase the average primary particle size to be relatively large at a level of from 0.18 to 0.50 µm, and which is obtained by emulsion polymerization. Further, another object of the present invention is to provide a PTFE fine powder which is obtained from such an aqueous PTFE emulsion and which is excellent in paste extrusion processability, and further to provide a porous material obtained from the PTFE fine powder.

Means to Accomplish the Objects

The present inventors have found that in emulsion polymerization of TFE, by using a fluorinated emulsifier of the formula (1) in an amount of from 1,500 to 20,000 ppm, based on the final yield of PTFE, polymerization can be carried out smoothly even if TFE is polymerized alone or copolymerized with a small amount of a fluorinated comonomer. Further, they have found that it is possible to increase the average primary particle size of PTFE obtained to be relatively large at a level of from 0.18 to 0.50 µm; it is possible to provide a high molecular weight PTFE having a standard specific gravity of from 2.14 to 2.20; and the PTFE fine powder obtained from the aqueous PTFE emulsion is excellent in paste extrusion.

The present invention has been accomplished on the basis of these discoveries.

Namely, the present invention provides the following:

1. An aqueous PTFE emulsion obtained by carrying out emulsion polymerization of TFE alone or together with another copolymerizable monomer in an aqueous medium, wherein a fluorinated emulsifier of the formula (1):

$$XCF_2CF_2(O)_mCF_2CF_2OCF_2COOA$$

wherein X is a hydrogen atom or a fluorine atom, A is a hydrogen atom, an alkali metal or $NH_4$, and m is an integer of 0 or 1, is used in an amount of from 1,500 to 20,000 ppm, based on the final yield of PTFE.

2. The aqueous PTFE emulsion according to the above 1, wherein the average primary particle size of PTFE in the aqueous PTFE emulsion is from 0.18 to 0.50 µm.

3. The aqueous PTFE emulsion according to the above 1 or 2, wherein the amount of the fluorinated emulsifier of the formula (1) is from 2,000 to 20,000 ppm, based on the final yield of PTFE.

4. The aqueous PTFE emulsion according to any one of the above 1 to 3, wherein the fluorinated emulsifier of the formula (1) is $CF_3CF_2OCF_2CF_2OCF_2COONH_4$.

5. A PTFE fine powder obtained by coagulating the aqueous PTFE emulsion as defined in any one of the above 1 to 4.

6. The PTFE fine powder according to the above 5, which has a standard specific gravity of from 2.14 to 2.20.

7. A porous material of PTFE obtained by paste extrusion of the PTFE fine powder as defined in the above 5 or 6, followed by stretching.

EFFECTS OF THE INVENTION

The aqueous PTFE emulsion of the present invention is free from an environmental problem which may be brought about by perfluorooctanoic acid or its salt. Further, the aqueous emulsion of the present invention is capable of providing PTFE having a high molecular weight, and it is capable of increasing its average primary particle size to be relatively large at a level of from 0.18 to 0.50 µm. Further, the PTFE fine powder of the present invention is excellent in various characteristics, such as paste extrusion processability. The PTFE porous material of the present invention is excellent in various characteristics.

BEST MODE FOR CARRYING OUT THE INVENTION

In the present invention, emulsion polymerization is carried out by using TFE alone, or TFE together with another copolymerizable monomer (hereinafter referred to as a comonomer).

A comonomer may, for example, be HFP, a perfluoro(alkyl vinyl ether) (PFAVE), chlorotrifluoroethylene (CTFE), a (perfluoroalkyl)ethylene, vinyledene fluoride (VdF), a perfluoro(alkenyl vinyl ether), VDF, perfluoro(2,2-dimethyl-1,3-dioxole) or a perfluoro(4-alkyl-1,3-dioxole). Such comonomers may be used alone or in combination as a mixture of two or more of them.

In the present invention, PTFE obtained by emulsion polymerization includes both a TFE homopolymer and a modified PTFE. Both the TFE homopolymer and the modified PTFE are polymers having non-melt processability.

The modified PTFE is a polymer having TFE copolymerized with a comonomer to such an extent that no melt processability is given. The content of constituting units based on the comonomer in the modified PTFE is preferably at most 0.5 mass %, more preferably at most 0.4 mass %, based on the total constituting units.

The amount of the comonomer to be introduced at the beginning of polymerization in the production of the modified PTFE, varies depending upon the type of the comonomer. However, the larger the amount of comonomer introduced, the higher the stability of the resulting aqueous emulsion becomes, so that the average primary particle size will decrease. In the present invention, the amount of the comonomer to be introduced at the beginning, is set to bring the average primary particle size to a level of from 0.18 to 0.50 µm.

The amount of the comonomer to be introduced at the beginning, is preferably from 0 to 0.5 mass %, more preferably from 0 to 0.4 mass %, based on the final yield of PTFE.

The fluorinated emulsifier of the formula (1) is suitably used, since it provides a good function to stabilize the polymerization for PTFE. In the formula (I), X is preferably a fluorine atom from the viewpoint of stability. Further, the value for m is preferably 1 from the viewpoint of the stability of polymerization and the mechanical stability of the aqueous PTFE emulsion.

A may, for example, be H, Li, Na, K or $NH_4$. $NH_4$ is particularly preferred because it has good solubility in water, and no metal ion component will remain in the PTFE fine powder as an impurity.

Among the fluorinated emulsifiers of the formula (I), particularly preferred is e.g. $CF_3CF_2CF_2CF_2OCF_2COONH_4$ or $CF_3CF_2OCF_2CF_2OCF_2COONH_4$ (hereinafter referred to as EEA), and EEA is more preferred.

The fluorinated emulsifier of the formula (1) is obtained by a known fluorination method such as a liquid phase fluorination method, wherein the corresponding non-fluorinated emulsifier or an ester of a partly fluorinated compound, is used and reacted with fluorine in a liquid phase, a fluorination method using a cobalt fluoride, or an electrochemical fluorination method, and the obtained fluorinated ester bond is hydrolyzed, followed by purification and then by neutralization with ammonia.

When emulsion polymerization of TFE is carried out, the fluorinated emulsifier of the formula (1) is used in an amount of from 1,500 to 20,000 ppm, based on the final yield of PTFE and preferably from 2,000 to 20,000 ppm, based on the final yield of PTFE. If the amount of the fluorinated emulsifier of the formula (1) to be used, is too large, the shape of the primary particles tends to be in a rod-shape, and the aqueous emulsion will be unstable.

In the emulsion polymerization in the present invention, during the polymerization of TFE or TFE together with another comonomer, an aqueous medium, the fluorinated emulsifier of the formula (1), a stabilization agent, a polymerization initiator, etc. are used. Further, as conditions for the polymerization, the polymerization temperature is preferably from 10 to 95° C., the polymerization pressure is preferably from 0.5 to 4.0 MPa, and the polymerization time is from 90 to 520 minutes.

The stabilization agent may, for example, be paraffin wax, a fluorine-based oil, a fluorine-based solvent or silicone oil. Such stabilization agents may be used alone or in a combination as a mixture of two or more of them. As the stabilization agent, paraffin wax is preferred. Paraffin wax may be liquid, semisolid or solid at room temperature, and a saturated hydrocarbon having at least 12 carbon atoms, is preferred. The melting point of the paraffin wax is usually preferably from 40 to 65° C., more preferably from 50 to 65° C. The amount of the stabilization agent to be used is preferably from 0.1 to 12 mass %, more preferably from 0.1 to 8 mass %, based on the mass of water to be used.

As a polymerization initiator, e.g. a water-soluble radical initiator, or a water-soluble oxidation-reduction catalyst is suitably used. As the water-soluble radical initiator, preferred is a persulfate such as ammonium persulfate or potassium persulfate, or a water-soluble organic peroxide such as disuccinic acid peroxide, bisglutaric acid peroxide or tert-butylhydroperoxide. Such polymerization initiators may be used alone or in combination as a mixture of two or more of them. Further, an oil-soluble initiator may also be used in the same manner. As the polymerization initiator, disuccinic acid peroxide is more preferred.

The amount of the polymerization initiator to be used is usually preferably from 0.01 to 0.20 mass %, more preferably from 0.01 to 0.15 mass %, based on the final yield of PTFE.

In the emulsion polymerization of the present invention, it is possible to use a chain transfer agent such as an alcohol of e.g. methanol or ethanol, in order to control the molecular weight of PTFE and to increase the stability of the aqueous emulsion. As the chain transfer agent, methanol is more preferred.

The amount of the chain transfer agent to be used is usually preferably from 0 to $1 \times 10^{-4}$ mass % and more preferably from 0 to $5 \times 10^{-5}$ mass %, based on the final yield of PTFE.

According to the present invention, the average primary particle size of primary particles of PTFE in the aqueous PTFE emulsion obtained by emulsion polymerization, can be made to be in a range of from 0.18 to 0.50 µm, particularly in a range of from 0.19 to 0.40 µm. In the present invention, the average primary particle size is a median size measured by a laser scattering particle size partition analyzer.

The PTFE concentration in the aqueous PTFE emulsion obtained by emulsion polymerization is preferably from 10 to 45 mass %. If the PTFE concentration is too low, it will be difficult to coagulate the primary particles of PTFE from the aqueous emulsion. If the PTFE concentration is too high, the non-coagulated primary particles of PTFE will remain, and the liquid from coagulation will be turbid. The PTFE concentration is more preferably from 15 to 45 mass %, further preferably from 20 to 40 mass %.

As a method to obtain a PTFE fine powder from the aqueous PTFE emulsion, a known method may be used. For example, a method may be mentioned wherein the aqueous PTFE emulsion is diluted with water to a concentration of from 8 to 20 mass %, followed by intense stirring to coagulate the primary particles of PTFE. The pH may be adjusted, or coagulant such as an electrolyte or a water-soluble organic solvent, may be added. Then, by stirring properly, the PTFE fine powder having its primary particles coagulated, is separated from water, followed by granulation, particle size regulation and drying, to obtain a PTFE fine powder.

The fluorinated emulsifier of the formula (1) contained in the aqueous medium after coagulated PTFE is separated, is recovered by using a method of adsorbing it by an ion exchange resin or a concentration method of e.g. evaporating water.

Drying the PTFE fine powder is usually carried out in a state of causing little flow of wet powder obtained by usual coagulation, preferably in a state of leaving it at rest, by means of vacuum, a high frequency wave, hot air or the like. The drying is carried out preferably from 10 to 250° C., particularly preferably from 100 to 230° C.

The fluorinated emulsifier of the formula (1) adsorbed on the PTFE fine powder is recovered by introducing the air discharged during the drying, to an alkaline aqueous liquid.

By the present invention, it is possible to bring the specific gravity of the PTFE fine powder to a range of from 2.14 to 2.20, and it is possible to obtain PTFE having a high molecular weight. Further, by changing the conditions for emulsion polymerization, it is possible to bring the specific gravity to a range of more than 2.20 and up to 2.25.

Further, the average particle size of the PTFE fine powder of the present invention is preferably from 350 to 650 µm, more preferably from 400 to 600 µm. Further, the bulk density is preferably from 0.35 to 0.65 g/ml, more preferably from 0.40 to 0.60 g/ml.

When the average particle size is in this range, the PTFE fine powder will be excellent in paste extrusion processability, and the shaped product will be excellent in smoothness on the surface.

The PTFE fine powder of the present invention may be used for paste extrusion. The paste extrusion is carried out in such a manner that the PTFE fine powder is mixed with a lubricant to let the fine power have flowability to form a product such as a film or a tube. The mixing ratio of the lubricant may be set properly to let the fine powder have flowability, and it is usually from 10 to 30 mass %, particularly preferably from 15 to 20 mass %. As the lubricant, it is preferred to use naphtha or a petroleum hydrocarbon having a dry point of at least 100° C.

Further, an additive such as a pigment for coloring or various fillers for imparting strength and electric conductivity may be added.

The PTFE of the present invention is preferably one having its stress relaxation time of at least 500 seconds, more preferably at least 530 seconds, particularly preferably at least 550 seconds.

The shape of the paste extrusion product of the PTFE fine powder may be various such as a tube-shape, a sheet-shape, a film-shape or a fiber-shape. Its applications may, for example, be tubes, wire coverings, sealing materials, porous membranes or filters.

The paste extrusion product of the PTFE fine powder is then stretched to obtain a PTFE porous material. As the conditions for the stretching, a proper speed of e.g. 5%/second to 1,000%/second and a proper stretching rate of e.g. at least 500%, are used.

The porosity of the porous material is not particularly limited, but the porosity is usually preferably in a range of from 50 to 99%, particularly preferably from 70 to 98%. An article constituted by the porous material may be in various shapes e.g. a tube-shape, a sheet-shape, a film shape or a fiber-shape.

EXAMPLES

Now, the present invention will be described in further detail with reference to Examples and Comparative Examples, but it should be understood that the present invention is by no means restricted thereto. Methods for measuring characteristics of the PTFE fine powder are as follows:

(A) Average primary particle size (UNIT: μm) of PTFE obtained from emulsion polymerization: Measured by using a laser scattering particle size partition analyzer (trade name: "LA-920", manufactured by HORIBA, Ltd.).

(B) Standard specific gravity (hereinafter referred to also as "SSG"): Measured in accordance with ASTM D1457-91a and D4895-91a. 12.0 g of PTFE was weighed and kept in a cylindrical die with an inner diameter of 28.6 mm under a pressure of 34.5 MPa for 2 minutes. It was put into an oven at 290° C., and the temperature was raised at a rate of 120° C./hr. It was kept at 380° C. for 30 minutes, then, the temperature was lowered at a rate of 60° C./hr, and it was kept at 294° C. for 24 minutes. The shaped product was kept in a desiccator at 23° C. for 12 hours. Thereafter, the specific gravity of the shaped product to water at 23° C. was measured and taken as the standard specific gravity.

(C) Average particle size (UNIT: μm) of fine powder: Measured in accordance with JIS K6891. 20, 30, 40 and 60 mesh standard sieves were piled in this order from the top. The powder was put on the 20 mesh sieve and sieved, and the mass of PTFE powder remained on each sieve was measured. The 50% particle size calculated by a logarithmic probability paper based on the above mass, is designated as the average particle size.

(D) Apparent density (unit: g/ml): Measured in accordance with JIS K6891. Into a stainless steel weighing bottle with an inner volume of 100 ml, a sample was dropped from a funnel set above, and a part of the sample bulging from the weighing bottle was scraped off with a flat plate. Thereafter, the weight of the sample remaining in the weighing bottle was measured, and a value obtained by dividing the weight of the sample by the inner volume of the weighing bottle was taken as the apparent density.

(E) Evaluation for Extrusion Pressure and Stretchability 100 g of the PTFE fine powder which was left at room temperature for more than two hours, was added into a glass bottle having an internal capacity of 900 cc, and 21.7 g of a lubricant, Isopar H (registered trademark; manufactured by Exxon Corporation) was added, followed by mixing for 3 minutes to obtain a PTFE mixture. The obtained PTFE mixture was left in a constant temperature chamber for 2 hours and then, extruded through an orifice having a diameter of 2.5 cm, a land length of 1.1 cm and an introduction angle of 30°, at 25° C. under conditions of a reduction ratio (ratio of the cross-section of the inlet to the cross-section of the outlet of the die) of 100 and an extrusion rate of 51 cm/minute, to obtain a paste extruded bead. The pressure required for the extrusion at that time was measured, and it was designated as an extrusion pressure. The obtained bead was dried at 230° C. for 30 minutes to remove the lubricant. Then, the bead was cut into a proper length, each end was clamped so that the length between clamps be 3.8 cm or 5.1 cm, and it was heated at 300° C. in an air circulating oven. Then, it was stretched at a prescribed rate until the length between the clamps became the prescribed one.

This method for stretching was essentially the method disclosed in U.S. Pat. No. 4,576,869, except for a different extrusion rate (51 cm/minute). "Stretching" is an increase in length, and it is usually represented in relation with the original length.

(F) Measurement of Break Strength

A sample for measurement of break strength was produced by stretching the bead in the same manner as in the evaluation for stretchability, under conditions of a length between clamps being 5.1 cm, a stretching rate of 100%/second and the total stretching of 2400%. The break strength was measured as the minimum tensile break load among three samples obtained from the stretched bead, i.e. one sample from each end of the stretched bead (if a neck-down was contained between clamps, such was omitted) and one sample from the center thereof. The sample was firmly clamped by a movable jaw with a gauge length of 5.0 cm, and the movable jaw was driven at a rate of 300 mm/minute, whereby the break strength was measured at room temperature by using TENSILON (A&D Co., LTD).

(G) Measurement of Stress Relaxation Time

A sample for measurement of stress relaxation time was produced by stretching the bead in the same manner as in the evaluation for stretchability, under conditions of a length between clamps being 3.8 cm, a stretching rate of 1000%/second and the total stretching of 2400%. Each end of this sample of the stretched bead was fixed by a fixture, and it was strained to have a total length of 25 cm. The stress relaxation time is a time required for this sample to break when it is left in an oven at 390° C. This temperature corresponds to higher than 380° C. which is the temperature disclosed in the specification of U.S. Pat. No. 5,470,655, and at which a stretched chain form melts. A sample fixed by the fixture is put into the oven through a slot (to be covered) formed on a side of the oven, whereby the temperature will not be lowered during the introduction of the sample. Therefore, it is not necessary to take a time to restore the temperature, as disclosed in the specification of the U.S. Pat. No. 4,576,869.

Reference Example 1

Production Example of $CF_3CF_2OCF(CF_3)CF_2OCF(CF_3)COONH_4$ 2.58 g of CsF and 13.06 g of tetraglyme were charged into a hastelloy c autoclave having a capacity of 200 mL, followed by degassing, and then, 20.83 g of $CF_3COF$ was introduced. Then, the autoclave was cooled to −20° C., and under a hermetically sealed and stirred condition, 57.5 g of hexafluoropropene oxide was introduced over a period of about one hour. The initial pressure showed 0.6 MPa. The reaction was continued for about one hour until the pressure no longer decreased, and then, the autoclave was returned to room temperature to obtain 78.57 g of a reaction crude liquid. This liquid was subjected to a GC analysis, whereby it was found that in addition to the objective product, 49.7% of $CF_3CF_2OCF(CF_3)CF_2OCF(CF_3)COF$, 19.1% of $CF_3CF_2OCF(CF_3)COF$ and 12.8% of $CF_3CF_2O(CF(CF_3)CF_2O)_2CF(CF_3)COF$, were contained.

The same reaction was carried out by using 32.26 g of $CF_3COF$. Distillation and purification were carried out by combining 2 batches of the reaction crude liquid containing the obtained objective product. By using a 30 cm distillation column provided with a reflux condenser and packed with Helipack No. 1, 52.47 g of the objective product having a boiling point of 71° C./400 torr, was obtained. The objective product was charged in a reactor made of PTFE, and 2.32 g of water was drop-wise added with stirring to carry out hydrolysis. Then, HF was removed by nitrogen bubbling to obtain 50.45 g of a crude liquid of $CF_3CF_2OCF(CF_3)CF_2OCF(CF_3)COOH$. The crude liquid was subjected to simple distillation by a simple distillation apparatus made of glass to obtain 40 g of $CF_3CF_2OCF(CF_3)CF_2OCF(CF_3)COOH$.

Then, using 40 g of $CF_3CF_2OCF(CF_3)CF_2OCF(CF_3)COOH$, conversion to an ammonium salt was carried out. Namely, by using a reactor made of glass, 40 g of the above carboxylic acid was dissolved into 150 g of $CClF_2CF_2CHClF$, and then, 10.89 g of 28% ammonia water was drop-wise added thereto at room temperature to form the ammonium salt. After that, the solvent $CClF_2CF_2CHClF$ was distilled off, followed by drying under reduced pressure to obtain 39.4 g of $CF_3CF_2OCF(CF_3)CF_2OCF(CF_3)COONH_4$ as a white solid.

Reference Example 2

Measurement of 1-Octanol/Water Partition Coefficient (LogPOW)

In accordance with OECD Test Guideline 117, 1-octanol/water partition coefficient (LogPOW) of a fluorinated emulsifier was measured by using HPLC (high performance liquid chromatography).

Conditions for the measurement were as follows: column: TOSOH ODS-120T column (($\phi$ 4.6 mm×250 mm), eluent: acetonitrile/0.6 mass % of $HClO_4$ aqueous solution=1/1 (vol/vol %), flow rate: 1.0 mL/minute, sample amount: 300 μL, column temperature: 40° C., and detection light: UV 210 nm (WO2005-42593).

HPLC was carried out on standard substances (heptanoic acid, octanoic acid, nonanoic acid and decanoic acid) having known 1-octanol/water partition coefficients, and a calibration curve was prepared from the respective elution times and octanol/water partition coefficients of the respective standard substances. Based on this calibration curve, a value of partition coefficient (LogPOW) between 1-octanol and water was calculated from the elution time by HPLC of the fluorinated emulsifier. The results are shown in Table 1.

EEA has a small LogPOW value as compared to ammonium perfluorooctanate (APFO), thus indicating that its bioaccumulation potential is low. On the other hand, $CF_3CF_2OCF(CF_3)CF_2OCF(CF_3)COONH_4$ which was synthesized in Reference Example 1, has a structure similar to EEA, but its LogPOW value is larger than APFO, of which bioaccumulation potential is concerned about, thus indicating that its accumulation in a living organism is high.

Further, in general, in order to judge whether or not a chemical substance is apt to be accumulated in a living organism, a testing method for measurement of a partition coefficient (LogPOW) between 1-octanol and water, is stipulated. As the testing method, in addition to "Partition Coefficient (1-octanol/water) Shake Flask Method" as stipulated in OECD test guideline 107 and in Japanese Industrial Standards Z 7260-107 (2000), a HPLC method (high-performance liquid chromatography) as stipulated and published in OECD Test Guideline 117, is used. A compound having a large partition coefficient value has a large tendency for bioaccumulation, and a compound having a small value means a small tendency for bioaccumulation. In a case where the LogPOW value is less than 3.5, it is considered proper to judge that it is not a high-concentration, and bioaccumulation is also considered to be small.

TABLE 1

| Fluorinated emulsifier | LogPOW |
|---|---|
| $CF_3CF_2OCF_2CF_2OCF_2COONH_4$ | 3.13 |
| $CF_3(CF_2)_6COONH_4$ | 3.67 |
| $CF_3CF_2OCF(CF_3)CF_2OCF(CF_3)COONH_4$ | 4.03 |

Example 1

Into a 100 L stainless steel autoclave equipped with a baffle plate and a stirrer, 38 g of EEA, 776 g of paraffin wax and 68 liters of deionized water were charged. The air in the autoclave was replaced with nitrogen, and then the pressure was reduced, and 0.6 g of methanol was charged. Further, the pressure was increased by adding TFE and the temperature was raised to 66° C. with stirring. Then, the pressure was raised to 1.765 MPa by adding TFE, and 29.4 g of disuccinic acid peroxide (concentration: 80 mass %, the rest being water) was dissolved in 1 liter of warm water at about 70° C. and was injected into the autoclave. The inner pressure decreased to 1.746 MPa in about 1 minute and a half.

Polymerization was proceeded by adding TFE to keep the inner pressure of the autoclave at 1.765 MPa. The reaction was terminated at a point where the amount of TFE added reached 16.66 kg, and TFE in the autoclave was released into the atmosphere. The polymerization time was 98 minutes. The obtained aqueous PTFE emulsion was cooled, and the supernatant paraffin wax was removed. The aqueous emulsion had a solid content concentration of 19 mass %. The EEA used was 2270 ppm, based on the final yield of PTFE. Further, the average primary particle size of PTFE was 0.239 μm. Aggregates in the reactor were just about a trace.

This aqueous emulsion was diluted with pure water to a concentration of 10 mass % and adjusted to 20° C., followed by stirring and coagulation, thereby to obtain the PTFE fine powder. Then, this PTFE fine powder was dried at 120° C. The average particle size was 560 μm, the apparent density was 0.49 g/ml, and the standard specific gravity was 2.219.

Comparative Example 1

A reaction was carried out in the same manner as in Example 1, by adding TFE to keep the inner pressure of the autoclave at 1.765 MPa, except that 19 g of EEA was used. The polymerization rate was about 20 percent slower than in Example 1, and when the amount of TFE added reached 15.7 kg, an abnormal reaction i.e. sudden leaping up of the amount of TFE added took place. Therefore, the reaction was stopped after a polymerization period of 119 minutes. When TFE in the autoclave was released into the atmosphere and the autoclave was opened, about 4 kg of aggregates were recovered. By the reaction at the abnormal polymerization rate and the recovery of a large amount of the aggregates, it is considered that stable emulsion polymerization was deteriorated, and coagulative-failure of the aqueous emulsion was proceeded, whereby the polymerization was shifted to suspension polymerization having the aggregates as cores.

The aqueous emulsion had a solid content concentration of 14 mass %. The EEA used was 1210 ppm, based on the total amount of TFE added. Further, the average primary particle size was 0.268 μm. This aqueous emulsion was diluted with pure water to a concentration of 10 mass % and adjusted to 20° C., followed by stirring and coagulation, thereby to obtain the PTFE fine powder. Then, this PTFE fine powder was dried at 120° C. The standard specific gravity was 2.219.

Example 2

Into a 100 L stainless steel autoclave equipped with a baffle plate and a stirrer, 36 g of EEA, 555 g of paraffin wax and 60 liters of deionized water were charged. The air in the autoclave was replaced with nitrogen, and then the pressure was reduced. The pressure was increased by adding TFE, and the temperature was raised to 62° C. with stirring. Then the pressure was raised to 1.765 MPa by adding TFE, and 26.3 g of disuccinic acid peroxide (concentration: 80 mass %, the rest being water) was dissolved in warm water at about 70° C. and was injected into the autoclave. The inner pressure decreased to 1.746 MPa in about 3 minutes.

Polymerization was proceeded by adding TFE to keep the inner pressure of the autoclave at 1.765 MPa. EEA was dissolved in warm water, and the total of 53 g as EEA was added during the polymerization. The temperature was raised to 72° C. in a halfway. The reaction was terminated at a point where the amount of TFE added reached 22 kg, and TFE in the autoclave was released into the atmosphere. The polymerization time was 103 minutes. The obtained aqueous PTFE emulsion was cooled, and the supernatant paraffin wax was removed. The aqueous emulsion had a solid content concentration of 25 mass %. EEA used was 4050 ppm, based on the final yield of PTFE. Further, the average primary particle size was 0.262 μm. Aggregates in the reactor were just about a trace.

This aqueous emulsion was diluted with pure water to a concentration of 10 mass % and adjusted to 20° C., followed by stirring and coagulation, thereby to obtain the PTFE fine powder. Then, this PTFE fine powder was dried at 120° C. The average particle size was 560 μm, the apparent density was 0.48 g/ml, and the standard specific gravity was 2.213.

Example 3

Into a 100 L stainless steel autoclave equipped with a baffle plate and a stirrer, 70 g of EEA, 872 g of paraffin wax and 59 liters of deionized water were charged. The air in the autoclave was replaced with nitrogen, and then the pressure was reduced. The pressure was increased by adding TFE, and the temperature was raised to 70° C. with stirring. Then, the pressure was raised to 1.765 MPa by adding TFE, and 5.0 g of disuccinic acid peroxide (concentration: 80 mass %, the rest being water) was dissolved in 1 liter of warm water at about 70° C. and was injected into the autoclave. The inner pressure decreased to 1.746 MPa in about 3 minutes.

Polymerization was proceeded by adding TFE to keep the inner pressure of the autoclave at 1.765 MPa. EEA was dissolved in warm water, and the total of 125 g as EEA was added during the polymerization. Further, ammonium sulfite was dissolved in water, and the total of 4 g as the ammonium sulfite was added during the polymerization. The temperature was decreased to 64° C. in a halfway, and it was raised to 80° C. at the end of the polymerization. The reaction was terminated at a point where the amount of TFE added reached 23 kg, and TFE in the autoclave was released into the atmosphere. The polymerization time was 155 minutes. The obtained aqueous PTFE emulsion was cooled, and the supernatant paraffin wax was removed. The aqueous emulsion had a solid content concentration of 26 mass %. The EEA used was 8555 ppm, based on the final yield of PTFE. Further, the average primary particle size was 0.275 μm. Aggregates in the reactor were just about a trace.

This aqueous emulsion was diluted with pure water to a concentration of 10 mass % and adjusted to 20° C., followed by stirring and coagulation, thereby to obtain the PTFE fine powder. Then, this PTFE fine powder was dried at 220° C. The average particle size was 580 μm, the apparent density was 0.49 g/ml, and the standard specific gravity was 2.151. Further, in accordance with the measuring method (E), a paste extruded bead was obtained. The extrusion pressure was 21.3 MPa. This bead stretched was a uniform porous material having no rapture or void formed, and the break strength was 29.4 N. The stress relaxation time was 564 seconds.

INDUSTRIAL APPLICABILITY

The present invention provides an aqueous PTFE emulsion which does not substantially contain perfluorooctanoic acid or its salt and is free from environmental problems; a PTFE fine powder which is excellent in stretch extrusion processability; and a porous material. The applications may, for example, be various tubes, wire coverings, sealing materials, porous membranes or filters. Further, a paste extrusion product may, for example, be a product in various shapes such as a tube-shape, a sheet-shape, a film-shape, a fiber-shape or a block-shape.

The entire disclosure of Japanese Patent Application No. 2005-302340 filed on Oct. 17, 2005 including specification, claims and summary is incorporated herein by reference in its entirety.

What is claimed is:

1. A polytetrafluoroethylene fine powder obtained by coagulating an aqueous polytetrafluoroethylene emulsion obtained by carrying out emulsion polymerization of tetrafluoroethylene alone or together with another copolymerizable monomer in an aqueous medium, wherein a fluorinated emulsifier of the formula:

$$XCF_2CF_2(O)_mCF_2CF_2OCF_2COOA$$

wherein X is a hydrogen atom or a fluorine atom, A is a hydrogen atom, an alkali metal or $NH_4$, and m is an integer of 0 or 1, is used in an amount of from 1,500 to 20,000 ppm, based on the final yield of polytetrafluoroethylene.

2. The polytetrafluoroethylene fine powder according to claim 1, which has a standard specific gravity of from 2.14 to 2.20.

3. A porous material of polytetrafluoroethylene obtained by paste extrusion of the polytetrafluoroethylene fine powder as defined in claim 1, followed by stretching.

* * * * *